(12) United States Patent
Moon

(10) Patent No.: US 8,483,157 B2
(45) Date of Patent: Jul. 9, 2013

(54) APPARATUS AND METHOD FOR ALLOCATING RESOURCES IN A COMMUNICATION SYSTEM

(75) Inventor: Hi-Chan Moon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 12/806,493

(22) Filed: Aug. 13, 2010

(65) Prior Publication Data

US 2011/0038327 A1 Feb. 17, 2011

(30) Foreign Application Priority Data

Aug. 14, 2009 (KR) .................. 10-2009-0075450

(51) Int. Cl.
*H04W 4/00* (2009.01)
(52) U.S. Cl.
USPC ........................................ 370/329
(58) Field of Classification Search
USPC ......... 370/203, 204–215, 229–240, 310–337, 370/338–350, 395.1, 395.3, 395.4, 395.41, 370/395.42, 395.5, 395.52, 395.53, 412–421, 370/431–529, 523–520
See application file for complete search history.

(56) References Cited

U.S. PATENT DOCUMENTS

| | | | |
|---|---|---|---|
| 2008/0095037 A1* | 4/2008 | Chang et al. | 370/204 |
| 2008/0220790 A1* | 9/2008 | Cai et al. | 455/450 |
| 2008/0220799 A1* | 9/2008 | Tsai et al. | 455/509 |
| 2010/0136997 A1* | 6/2010 | Palanki et al. | 455/452.1 |
| 2010/0232546 A1* | 9/2010 | Yu et al. | 375/300 |
| 2011/0194412 A1* | 8/2011 | Park et al. | 370/241 |
| 2011/0250897 A1* | 10/2011 | Seo et al. | 455/445 |

FOREIGN PATENT DOCUMENTS

KR 10-2008-0020243 8/2006

OTHER PUBLICATIONS

"Control Channel Structure and Mapping Pattern of Backhaul Link", ZTE, TSG-RAN WG1 #56bis, R1-091424, Mar. 23-27, 2009. (7 pages).
"Resource Allocation and Downlink Control Channel Structure for Relay Backhaul Link", LG Electronics, 3GPP TSG RAN WG1 Meeting #57 R1-092115, May 4-8, 2009, 7 pages.
"TP to 36.912 on Relays and Carrier Aggregation", Nokia Siemens Networks, 3GPP TSG-RAN WG2 Meeting #66 bis R2-093694, Jun. 29-Jul. 3, 2009, 6 pages.
International Search Report dated Apr. 26, 2011 in connection with International Application No. PCT/KR2010/005325.

* cited by examiner

*Primary Examiner* — Jung-Jen Liu

(57) ABSTRACT

An apparatus and method allocate resources in a communication system including at least one relay station (RS). A control channel carrying control information from a BS to an MS is allocated into a first time region of a subframe. A data channel carrying data from the BS to the MS, an RS-control channel carrying control information from the BS to an RS, and an RS-data channel carrying data from the BS to the RS are allocated into a second time region of the subframe, using Frequency Division Multiplexing (FDM). And the subframe into which the control channel, the data channel, the RS-control channel and the RS-data channel are allocated is transmitted.

24 Claims, 8 Drawing Sheets

US 8,483,157 B2

APPARATUS AND METHOD FOR ALLOCATING RESOURCES IN A COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Aug. 14, 2009 and assigned Serial No. 10-2009-0075450, the entire disclosure of which is hereby incorporated by reference.

TECHNICAL FIELD OF THE INVENTION

The present invention relates to an apparatus and method for allocating resources in a communication system including at least one Relay Station (RS) (hereinafter referred to as an 'RS communication system').

BACKGROUND OF THE INVENTION

Next-generation communication systems have introduced at least one Relay Station (RS) that relays communication between a Base Station (BS) and a Mobile Station (MS) to expand coverage and enable communication in a shaded area while reducing power consumption of the MS. The RS transmits/receives signals on a subframe basis, and the subframe includes a Physical Control Format Indicator Channel (PCFICH) and a Physical Downlink Control Channel (PDCCH) carrying control information, and a Physical Downlink Shared Channel (PDSCH) carrying real data. Control information on the PCFICH/PDCCH and data on the PDSCH are transmitted by Time Division Multiplexing (TDM).

FIG. 1 illustrates a data transmission/reception operation in an RS communication system according to the present disclosure.

Referring to FIG. 1, the RS communication system includes a BS 101, an RS 103 and an MS 105. The BS 101 transmits a data signal S1 110 to the RS 103 for a time period T1, and after receiving the data signal S1, the RS 103 transmits a data signal S2 120 containing details of the S1 to the MS 105 for a time period T2. The MS 105 recognizes the RS 103 as one independent BS.

Because of the difficulty in communicating with both the BS 101 and the MS 105 using the same frequency resource, the RS 103 uses different time resources, e.g., time periods T1 and T2, for reception of the data signal S1 and transmission of the data signal S2 as shown in FIG. 1.

As such, the conventional RS communication system fixedly divides resources of a specific time period and uses them for signal exchanges between the RS and the BS, and between the RS and the MS, preventing effective use of the resources. For example, during a subframe allocated for data transmission from the BS to the RS, the conventional RS should wait for reception of data transmitted from the BS even if there is no data transmitted from the BS, making its data transmission to the MS impossible. So, during the subframe allocated for data transmission from the BS to the RS, no data can be transmitted undesirably. For these reasons, studies are made of RS communication systems capable of efficiently using resources.

SUMMARY OF THE INVENTION

To address the above-discussed deficiencies of the prior art, it is a primary object to provide at least the advantages described below. Accordingly, an aspect of the present invention is to provide a resource allocation method and apparatus for transmitting control information and data from a BS to an RS in an RS communication system.

Another aspect of the present invention is to provide a method and an apparatus for allocating resource so as to transmit both data from a BS to an RS and data from the BS to an MS using one subframe in an RS communication system.

Another aspect of the present invention is to provide a method and an apparatus in which if there is no data transmitted from a BS to an RS in an RS communication system, resources are allocated to the RS such that a subframe allocated for data transmission from the BS to the RS may be used for data transmission from the RS to an MS.

In accordance with one aspect of the present invention, there is provided an apparatus for allocating resources in a communication system including at least one Relay Station (RS), the apparatus including a control channel generator for generating a signal of a control channel carrying control information from a Base Station (BS) to a Mobile Station (MS) and for generating a signal of an RS-control channel carrying control information from the BS to an RS. A data channel generator generates a signal of a data channel carrying data from the BS to the MS and generates a signal of an RS-data channel carrying data from the BS to the RS. A resource allocator maps the signal of the control channel to a first time region of a subframe and maps the signals of the RS-control channel, the data channel and the RS-data channel to a second time region of the subframe. A transmitter transmits the subframe to which the signals of the control channel, the data channel, the RS-control channel and the RS-data channel are mapped. The channels mapped to the second time region may undergo Frequency Division Multiplexing (FDM).

In accordance with another aspect of the present invention, there is provided an apparatus for allocating resources in a communication system including at least one Relay Station (RS), the apparatus including a resource allocator for, if there is no data to be transmitted from a Base Station (BS) to an RS, allocating a first subframe allocated for data transmission from the BS to the RS to the RS such that the RS may use the first subframe for data transmission from the RS to a Mobile Station (MS). An indication information transmitter transmits to the RS indication information indicating presence or absence of data to be transmitted from the BS to the RS in the first subframe using a second subframe preceding the first subframe.

In accordance with another aspect of the present invention, there is provided a method for allocating resources in a communication system including at least one Relay Station (RS), the method including allocating, into a first time region of a subframe, a control channel carrying control information from a Base Station (BS) to a Mobile Station (MS) and allocating, into a second time region of the subframe, a data channel carrying data from the BS to the MS, an RS-control channel carrying control information from the BS to an RS, and an RS-data channel carrying data from the BS to the RS, using Frequency Division Multiplexing (FDM). The subframe into which the control channel, the data channel, the RS-control channel and the RS-data channel are allocated is transmitted.

In accordance with yet another aspect of the present invention, there is provided a method for allocating resources in a communication system including at least one Relay Station (RS), the method including, if there is no data to be transmitted from a Base Station (BS) to an RS, allocating a first subframe allocated for data transmission from the BS to the RS to the RS such that the RS may use the first subframe for data transmission from the RS to a Mobile Station (MS), and transmitting to the RS indication information indicating presence or absence of data to be transmitted from the BS to the RS in the first subframe using a second subframe preceding the first subframe.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

Figure 1:
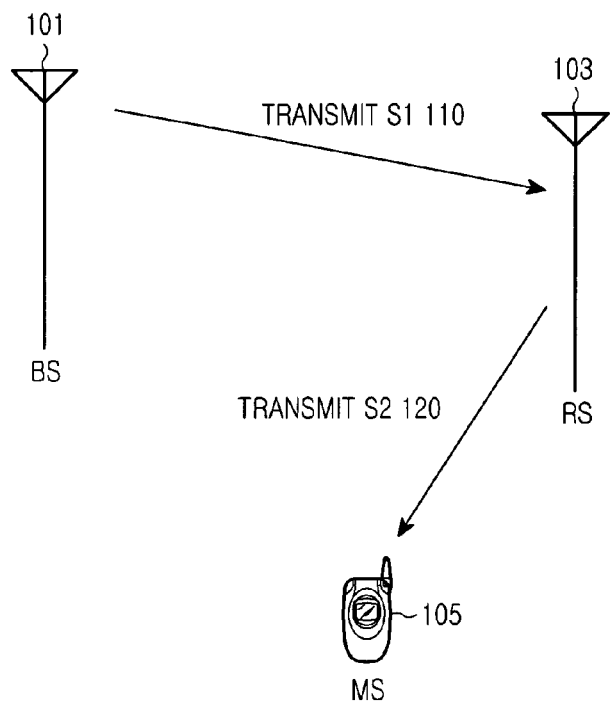
FIG. 1 is a diagram showing a data transmission/reception operation in an RS communication system according to the present disclosure.

FIGS. 2A through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In this specification, an embodiment will be described in detail, which allocates resources so as to transmit both the data to be transmitted from a BS to an RS and the data to be transmitted from the BS to an MS using one subframe in an RS communication system.

Furthermore, in this specification, an embodiment will be described in detail, in which if there is no data transmitted from a BS to an RS in an RS communication system, resources are allocated such that a subframe allocated for data transmission from the BS to the RS may be used for data transmission from the RS to an MS.

In the following detailed description of embodiments of the present invention, it is assumed that resource allocation is performed in an RS communication system that uses the Long Term Evolution (LTE) standard representing 3rd Generation Partnership Project (3GPP)-family communication networks. However, it should be noted that the present invention will not be limited to such specific standards and systems.

In a communication system using the LTE standard, within one subframe with a length of 1 ms, if a short Cyclic Prefix (CP) is used, 14 OFDM symbols are transmitted, and if a long CP is used, 12 OFDM symbols are transmitted. Control information on a PCFICH/PDCCH (Physical Control Format Indicator Channel/Physical Downlink Control Channel) and data on a Physical Downlink Shared Channel (PDSCH) are TDM-transmitted, in which a period of the PDSCH carrying data from a BS to an MS may be different in size from a period of a Relay-PDSCH (R-PDSCH) carrying data from the BS to an RS. However, the period of the R-PDSCH cannot be greater than the period of the PDSCH.

A location of the Relay-PCDCCH (R-PDCCH) carrying control information to the RS is variable according to the setting of the RS, and the varying location may be notified to RSs through an initial Broadcasting Channel (BCH). If one BS serves a plurality of RSs, a period for which the BS transmits data to each RS may be different. In this situation, the BS may set a period for transmitting data to each RS on a semi-static basis. To be specific, while informing the RS of a change in the data transmission period, the BS may inform the RS of a change in the location of the R-PDCCH. By varying a location of the R-PDCCH without fixing the location, flexible resource allocation may be ensured.

In this specification, the R-PDCCH is assumed to consist of a Relay-Primary Physical Downlink Control Channel (R-PPDCCH) and a Relay-Secondary Physical Downlink Control Channel (R-SPDCCH). Hence, control information transmitted to an RS is transmitted over two control channels: the R-PPDCCH and the R-SPDCCH. To be sure, however, even if control information transmitted from a BS to an RS is transmitted over one control channel, the resource allocation apparatus and method proposed in embodiments of the present invention may be used. The R-PPDCCH provides the RS with control information such as a location of resource to which the R-SPDCCH is allocated, a size of data transmitted from the BS to the RS, and a Modulation and Coding Scheme (MCS), while the R-SPDCCH provides the RS with control information such as a location of a resource to which the R-PDSCH is allocated, and an MCS. As such, by separately transmitting control information to be transmitted to the RS using two control channels, complexity of the RS may be reduced, which is caused by decoding of the control information.

It will be assumed in embodiments of the present invention that before receiving a signal transmitted from a BS, an RS knows in advance a location of a subframe used for signal transmission from the BS to the RS and a location of the R-PPDCCH in the subframe, by means of BCH or signaling.

Figure 2A:
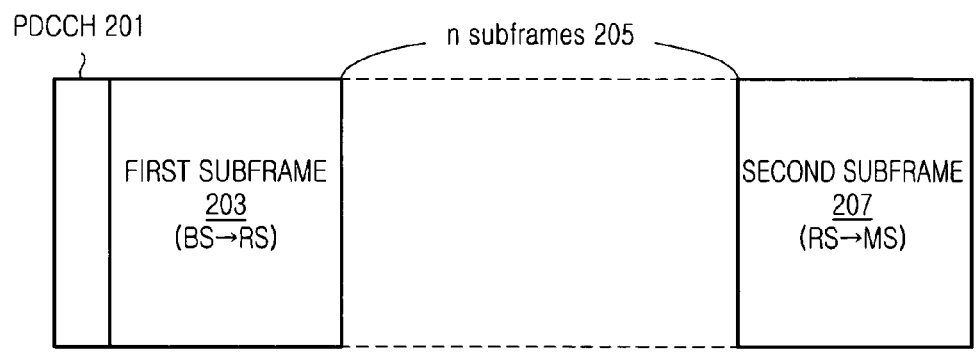
FIG. 2A illustrates a subframe used for signal transmission/reception of an RS in an RS communication system according to an embodiment of the present invention.

FIG. 2A illustrates a subframe used for signal transmission/reception of an RS in an RS communication system according to an embodiment of the present invention.

Referring to FIG. 2A, the subframe includes a PDCCH 201, a first subframe 203, and a second subframe 207. The PDCCH 201 carries control information to an MS, the first subframe 203 carries data from a BS to the RS, and after n subframes 205, the second subframe 207 carries data from the RS to the MS. Because the RS may also operate as one independent BS, the RS may manage resources through scheduling. Accordingly, a value of n may be set dynamically, rather than being fixed.

Figure 2B:
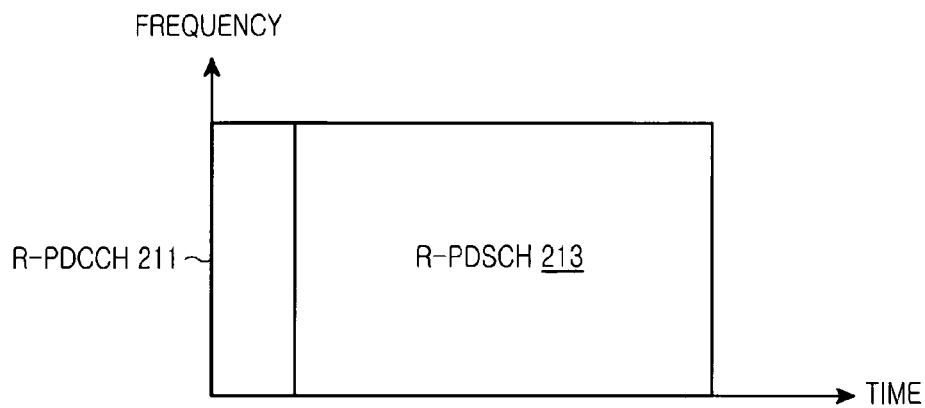
FIG. 2B illustrates a TDM transmission of control information on an R-PDCCH and data on an R-PDSCH according to an embodiment of the present invention.
Figure 2C:
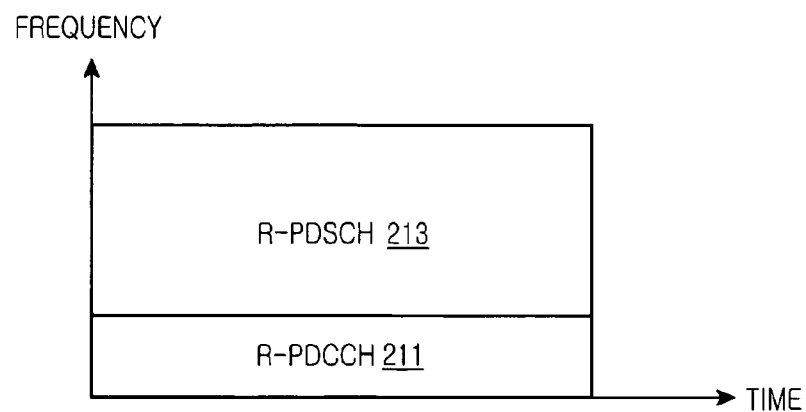
FIG. 2C illustrates a FDM transmission of control information on an R-PDCCH and data on an R-PDSCH according to an embodiment of the present invention.

FIGS. 2B and 2C illustrate examples of the first subframe 203 according to embodiments of the present invention. The first subframe 203 includes a Relay-Physical Downlink Control Channel (R-PDCCH) 211 carrying control information from the BS to the RS, and a Relay-PDSCH (R-PDSCH) 213 carrying data from the BS to the RS. FIG. 2B shows TDM transmission of control information on the R-PDCCH 211 and data on the R-PDSCH 213, while FIG. 2C shows Frequency Division Multiplexing (FDM) transmission of control information on the R-PDCCH 211 and data on the R-PDSCH 213.

The first subframe 203, as shown in FIG. 2B, carries data on the R-PDSCH 213 after the R-PDCCH 211 consisting of k1 Orthogonal Frequency Division Multiplexing (OFDM) symbols. This is because its change to a receive mode is possible after the RS transmits to the MS a control signal and a reference signal corresponding to as many Multicast Broadcast Single Frequency Networks (MBSFNs) as one to two OFDM symbols. Therefore, a signal transmitted from the BS to the RS is not allowed to use all OFDM symbols of the first subframe 203, and instead, is transmitted using the remaining symbols other than the first k1 OFDM symbols.

Meanwhile, if data transmission from the BS to the RS is performed in every subframe, the amount of traffic the BS should transmit to the RS is variable depending on the time. Hence, for more efficient resource allocation, a new scheme will be provided, which reallocates the subframe used for data transmission from the BS to the RS, so as to be used even for data transmission from the BS to the MS.

Figure 3:
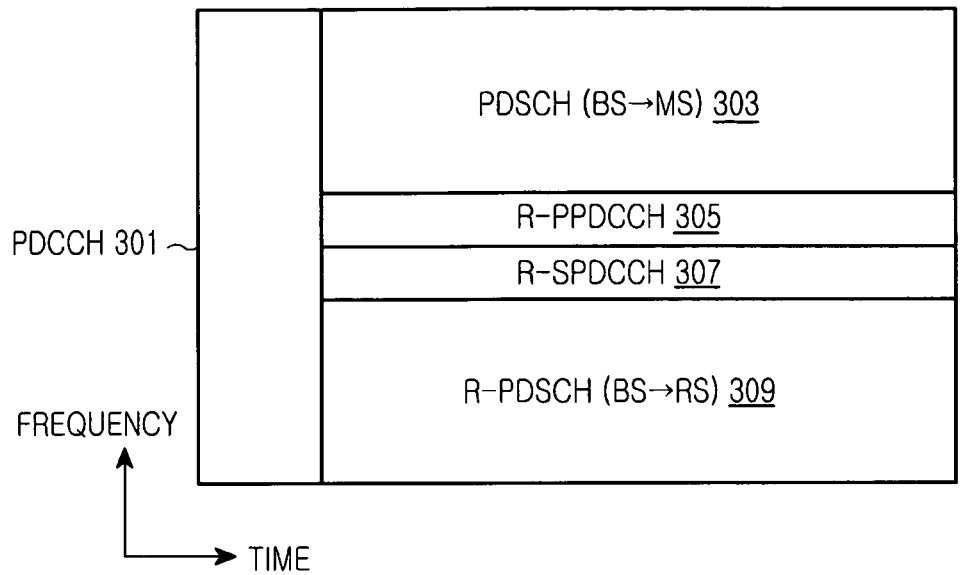
FIG. 3 illustrates a subframe structure used for data transmission/reception in an RS communication system according to an embodiment of the present invention.
Figure 4:
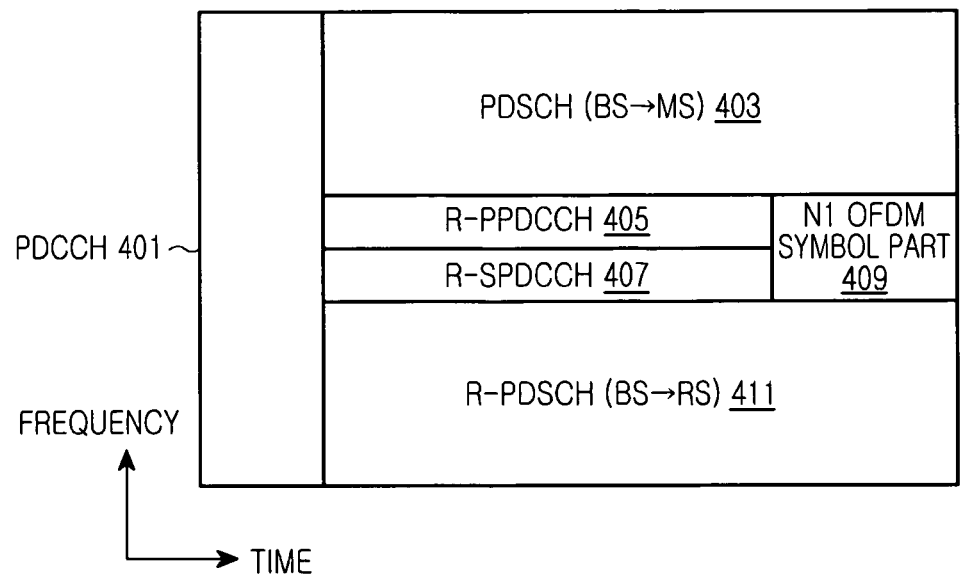
FIG. 4 illustrates a subframe structure used for data transmission/reception in an RS communication system according to an embodiment of the present invention.

FIGS. 3 and 4 illustrate allocations of a subframe in which a period of a PDSCH and a period of an R-PDSCH are equal in size, i.e., the PDSCH and the R-PDSCH are equal in number of their OFDM symbols. The OFDM symbols are distributed in the time region, and one OFDM symbol is generated by OFDM modulating a plurality of modulation symbols.

FIG. 3 illustrates a subframe structure used for data transmission/reception in an RS communication system according to an embodiment of the present invention.

Referring to FIG. 3, the subframe includes a PDCCH 301 allocated in a first time region, and a PDSCH 303, an R-PPDCCH 305, an R-SPDCCH 307 and an R-PDSCH 309 allocated in a second time region. The PDCCH 301 carries control information to an MS, the PDSCH 303 carries data from a BS to the MS, the R-PPDCCH 305 and R-SPDCCH 307 carry control information to an RS, and the R-PDSCH 309 carries data from the BS to the RS. In the second time region, data on the PDSCH 303, control information on the R-PPDCCH 305 and R-SPDCCH 307, and data on the R-PDSCH 309 are FDM-transmitted. In this way, the control information on the R-PPDCCH 305 and R-SPDCCH 307 and the data on the R-PDSCH 309 may be transmitted using the same time resources as those of the data on the PDSCH 303, making it possible to efficiently multiplex the data on the PDSCH 303 and the data on the R-PDSCH 309 during transmission.

A receiver of the RS stores in its buffer all signals (control signal and data) transmitted through one subframe, and then extracts control information on the R-PPDCCH 305 from the buffered signals, and demodulates and decodes the extracted control information. Thereafter, the RS's receiver demodulates and decodes control information on the R-SPDCCH 307 based on the decoded control information of the R-PPDCCH 305, and then demodulates and decodes data on the R-PDSCH 309 based on the decoded control information of the R-PPDCCH 305 and R-SPDCCH 307. To be sure, if control information is transmitted to the RS through one control channel, not through two control channels, then the RS demodulates and decodes data on the R-PDSCH 309 right after decoding the control information.

The receiver of the RS of FIG. 3 stores in the buffer all signals transmitted through one subframe and then performs demodulation and decoding, thereby increasing complexity of the buffer and causing a possible delay in the demodulation and decoding.

FIG. 4 illustrates a subframe structure used for data transmission/reception in an RS communication system according to an embodiment of the present invention.

Referring to FIG. 4, the subframe includes a PDCCH 401 allocated in a first time region, and a PDSCH 403, an R-PPDCCH 405, an R-SPDCCH 407, an N1-OFDM symbol part 409 and an R-PDSCH 411 allocated in a second time region. The N1-OFDM symbol part 409 consists of N1 OFDM symbols, and does not carry real information such as control information and data.

Data on the R-PDSCH 411 is transmitted using the same time resources, i.e., resources of the second time region, as those of data on the PDSCH 403. However, control information on the R-PPDCCH 405 and R-SPDCCH 407 share resources of the second time region with the N1-OFDM symbol part 409. That is, a front portion of the resources in the second time region is allocated for control information on the R-PPDCCH 405 and R-SPDCCH 407, while a rear portion thereof is allocated for the N1-OFDM symbol part 409.

To reduce the delay in demodulation and decoding according to FIG. 3, the N1-OFDM symbol part 409 consisting of the last N1 OFDM symbols among resources for control channels is used as null data in FIG. 4. To be specific, without waiting for control information carried on the R-PPDCCH 305 and R-SPDCCH 307 to be buffered, an RS's receiver demodulates and decodes control information on the R-PPDCCH 405 and R-SPDCCH 407 at the time the R-PPDCCH 405 and R-SPDCCH 407 terminate, i.e., at the time the N1-OFDM symbol part 409 starts, thereby reducing the delay in demodulation and decoding compared with the subframe structure of FIG. 3. In an alternative embodiment, the N1-OFDM symbol part 409 may be used for other controlling, which is not associated with signal transmission from the BS to the RS. For example, it may be used to transmit information about a change in system setting.

A description will be made of a subframe structure in which a period of a PDSCH is greater in size than a period of an R-PDSCH, i.e., the number of OFDM symbols occupying the PDSCH is greater than the number of OFDM symbols occupying the R-PDSCH.

Figure 5:
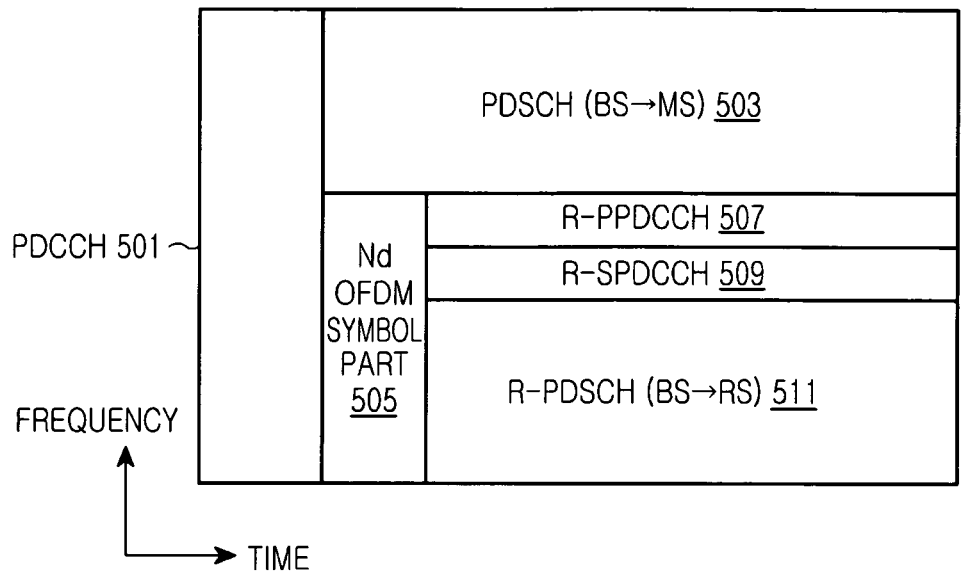
FIG. 5 illustrates a subframe structure used for data transmission/reception in an RS communication system according to an embodiment of the present invention.

FIG. 5 illustrates a subframe structure used for data transmission/reception in an RS communication system according to an embodiment of the present invention.

Referring to FIG. 5, the subframe includes a PDCCH 501 allocated in a first time region, and a PDSCH 503, an Nd-OFDM symbol part 505, an R-PPDCCH 507, an R-SPDCCH 509 and an R-PDSCH 511 allocated in a second time region. The Nd-OFDM symbol part 505 consists of Nd OFDM symbols, and does not carry real information.

Control information on the R-PPDCCH 507 and R-SPDCCH 509 and data on the R-PDSCH 511 share resources allocated in the second time region with the Nd-OFDM symbol part 505. That is, a front portion of the resources in the second time region is allocated for the Nd-OFDM symbol part 505, while a rear portion thereof is allocated for control information on the R-PPDCCH 507 and R-SPDCCH 509 and data on the R-PDSCH 511. The control information on the R-PPDCCH 507 and R-SPDCCH 509 and the data on the R-PDSCH 511, which correspond to the rear portion of the second time region, are FDM-transmitted. Therefore, in FIG. 5, the R-PPDCCH 507, the R-SPDCCH 509 and the R-PDSCH 511 other than the Nd-OFDM symbol part 505 are used for signal transmission from the BS to the RS. The reason why the real information is not carried on the Nd-OFDM symbol part 505 is to change to a receive mode after transmitting to an MS control signals and reference signals corresponding to as many MBSFNs as the Nd OFDM symbols.

Meanwhile, a value of Nd is determined based on the number of OFDM symbols of the PDSCH and the number of OFDM symbols of the R-PDSCH. For example, the Nd can be can be defined as:

$$Nd=\text{(Number of OFDM Symbols of PDSCH)}-\text{(Number of OFDM Symbols of R-PDSCH)} \quad \text{[Eqn. 1]}$$

Figure 6:
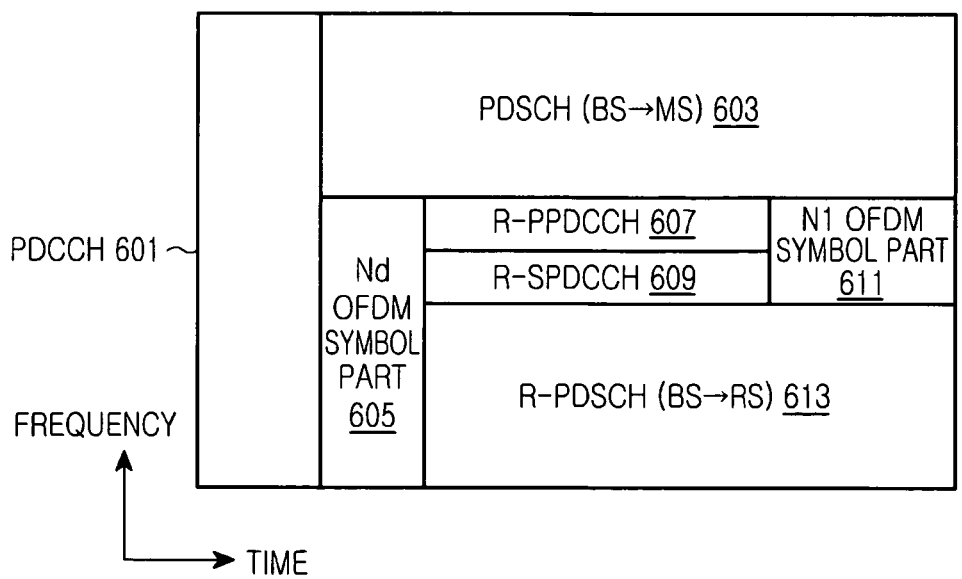
FIG. 6 illustrates a subframe structure used for data transmission/reception in an RS communication system according to an embodiment of the present invention.

FIG. 6 illustrates a subframe structure used for data transmission/reception in an RS communication system according to an embodiment of the present invention.

Referring to FIG. 6, the subframe includes a PDCCH 601 allocated in a first time region, and a PDSCH 603, an Nd-OFDM symbol part 605, an R-PPDCCH 607, an R-SPDCCH 609, an N1-OFDM symbol part 611 and an R-PDSCH 613 allocated in a second time region. The Nd-OFDM symbol part 605 consists of Nd OFDM symbols, the N1-OFDM symbol part 611 consists of N1 OFDM symbols, and each of the Nd-OFDM symbol part 605 and the N1-OFDM symbol part 611 does not carry real tion.

The R-PPDCCH 607, the R-SPDCCH 609, and the R-PDSCH 613 share frequency resources allocated in the second time region with the Nd-OFDM symbol part 605, and the R-PPDCCH 607 and the R-SPDCCH 609 share frequency resources allocated in the second time region not only with the Nd-OFDM symbol part 605 but also the N1-OFDM symbol part 611. That is, a front portion of the time resources in the second time region is allocated for the Nd-OFDM symbol part 605, while a rear portion thereof is allocated for control information on the R-PPDCCH 607 and R-SPDCCH 609 and data on the R-PDSCH 613. Among the resources allocated for the R-PPDCCH 607 and R-SPDCCH 609, resources allocated to the last N1 OFDM symbols are allocated for the N1-OFDM symbol part 611. Control information on the R-PPDCCH 607 and R-SPDCCH 609 and data on the R-PDSCH 613, which correspond to the rear portion of the second time region, are FDM-transmitted.

Therefore, in FIG. 6, the remaining OFDM symbols other than the first Nd OFDM symbols and the last N1 OFDM symbols are used as the R-PPDCCH 607 and the R-SPDCCH 609, for transmission of control information from a BS to an RS, and the remaining R-PDSCH 613 other than the first Nd OFDM symbols is used for data transmission from the BS to the RS. The N1-OFDM symbol part 611 may be used for other controlling, which is not associated with signal transmission from the BS to the RS. For example, it may be used to transmit information about a change in system setting.

Figure 7:
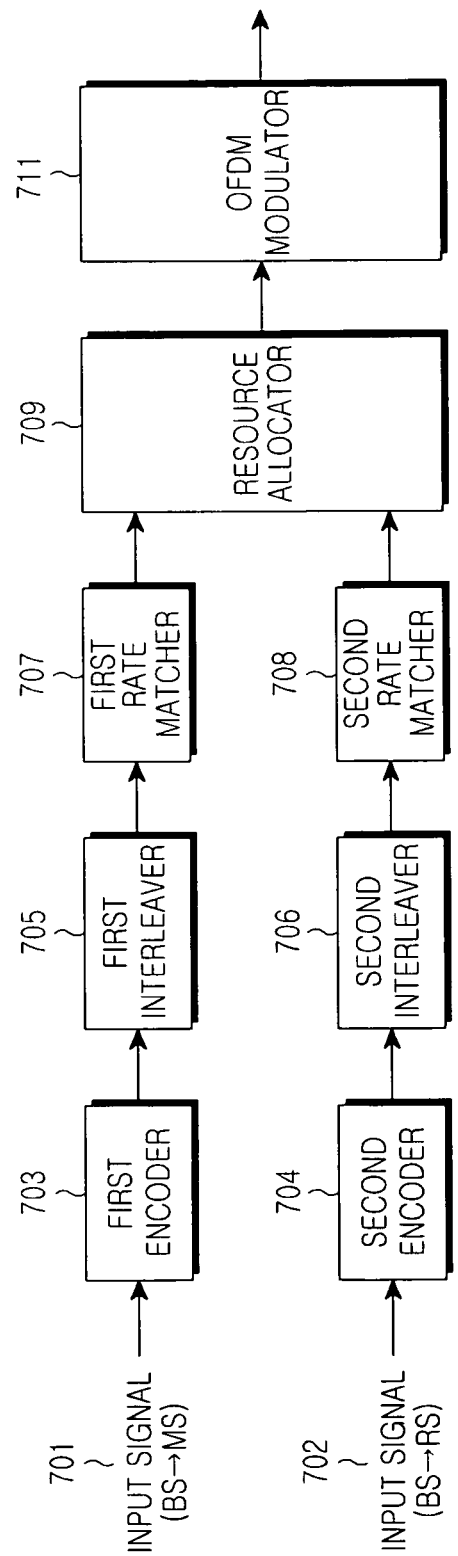
FIG. 7 illustrates a transmitter of a BS in an RS communication system according to an embodiment of the present invention.

FIG. 7 illustrates a transmitter of a BS in an RS communication system according to an embodiment of the present invention.

Referring to FIG. 7, the BS's transmitter includes first and second encoders 703 and 704, first and second interleavers 705 and 706, first and second rate matchers 707 and 708, a resource allocator 709, and an OFDM modulator 711. The first and second encoders 703 and 704, the first and second interleavers 705 and 706, and the first and second rate matchers 707 and 708 may be referred to as a data channel generator. Although not illustrated, there is a control channel generator for generating a control channel signal corresponding to a data channel signal generated by the data channel generator.

A signal to be transmitted from a BS to an MS is input to the first encoder 703, and the first encoder 703 encodes an input signal 701 and outputs the encoded signal to the first interleaver 705. The input signal may include both control information and data, or only the data. If the input signal includes only the data, the control information may be processed through a separate path and then input to the resource allocator 709. The first interleaver 705 interleaves a signal output from the first encoder 703, and outputs the interleaved signal to the first rate matcher 707. The first rate matcher 707 performs rate matching on a signal output from the first interleaver 705, and outputs the result to the resource allocator 709. The 'rate matching' means an operation of matching the number of bits of the data to be transmitted, to a predetermined number of bits through puncturing and/or repetition.

A signal to be transmitted from the BS to an RS is input to the second encoder 704, and the second encoder 704 encodes an input signal 702 and outputs the encoded signal to the second interleaver 706. The second interleaver 706 interleaves a signal output from the second encoder 704, and outputs the interleaved signal to the second rate matcher 708. The second rate matcher 708 performs rate matching on a signal output from the second interleaver 706, and outputs the result to the resource allocator 709.

The resource allocator 709 receives outputs of the first and second rate matchers 707 and 708, i.e., outputs of the data channel generator, and outputs of the control channel generator, maps them to subframe resources, which are allocated for transmission of the input signals 701 and 702 as described in FIGS. 3 to 6, and outputs the result to the OFDM modulator 711. The OFDM modulator 711, consisting of an Inverse Fast Fourier Transform (IFFT) block, modulates the resource-mapped signals into OFDM symbols and performs Radio Frequency (RF) processing on the OFDM symbols.

Figure 8:
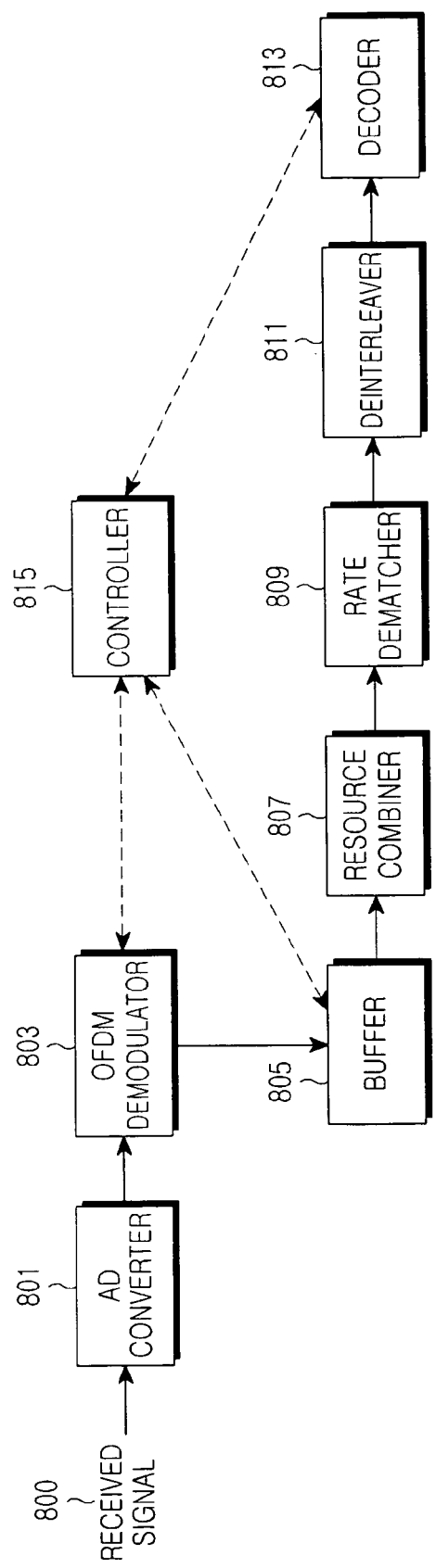
FIG. 8 illustrates a receiver of an RS in an RS communication system according to an embodiment of the present invention.

FIG. 8 illustrates a receiver of an RS in an RS communication system according to an embodiment of the present invention.

Referring to FIG. 8, the RS's receiver includes an Analog-to-Digital (AD) converter 801, an OFDM demodulator 803, a buffer 805, a resource combiner 807, a rate dematcher 809, a deinterleaver 811, a decoder 813, and a controller 815.

A received signal 800 output by the BS's transmitter is input to the AD converter 801, and the AD converter 801 AD-converts the input signal and outputs the AD-converted signal to the OFDM demodulator 803 consisting of a Fast Fourier Transform (FFT) block. The OFDM demodulator 803 converts a time-domain signal output from the AD converter 801 into a frequency-domain signal and stores the output signal in the buffer 805. Although it is assumed in FIG. 8 that the converted frequency-domain signal is stored in the buffer 805, it is also possible that the output of the AD converter 801 may be stored in the buffer 805 without being converted into a frequency-domain signal, accumulated for a predetermined time period, and then OFDM-demodulated by the OFDM demodulator 803.

The buffer 805 accumulates the frequency-domain signal output from the OFDM demodulator 803 for a time period occupied by one subframe, and then outputs the accumulated signal to the resource combiner 807. The resource combiner 807 receives a signal output from the buffer 805, extracts a signal in a specific resource region according to an allocation rule of the resource allocator 709 in FIG. 7, and outputs the extracted signal to the rate dematcher 809. In other words, the resource combiner 807 first extracts signals on control channels carrying control information among the resources transmitted to the RS.

Thereafter, the rate dematcher 809 performs rate dematching on a signal output from the resource combiner 807, and outputs the result to the deinterleaver 811. The deinterleaver 811 deinterleaves a signal output from the rate dematcher 809, and outputs the deinterleaved signal to the decoder 813. The decoder 813 extracts control information by decoding a signal output from the deinterleaver 811, and the extracted control information is applied to the controller 815. The controller 815 checks the resource allocation for a data channel based on the received control information, and the resource combiner 807 extracts a signal on the data channel under the control of the controller 815. The extracted data channel signal is processed once again by means of the OFDM demodulator 803 through the decoder 813, and the final data is extracted through the demodulation and decoding.

Although a BS allocates a subframe at regular intervals for data transmission to an RS, the allocated subframe is not always used for data transmission from the BS to the RS. Now, a new scheme will be provided, in which if a specific subframe among the allocated subframes is not used for data transmission from a BS to an RS, the BS provides related information to the RS in advance such that the RS may use the specific subframe for data transmission to an MS.

Figure 9A:
FIGS. 9A and 9B illustrate TDM transmission of subframes used for data transmission from a BS to an RS in an RS communication system according to an embodiment of the present invention.
Figure 9B:

FIGS. 9A and 9B illustrate TDM transmission of subframes used for data transmission from a BS to an RS in an RS communication system according to embodiments of the present invention.

FIG. 9A illustrates TDM transmission when one subframe B exists between subframes A. Alternatively, Nb subframes B may exist between subframes A. FIG. 9B illustrates TDM transmission when two subframes B exist between subframes A.

Referring to FIGS. 9A and 9B, the subframes A and the subframes B each are allocated at regular intervals. The subframes A are used to transmit data from a BS to an RS, while the subframes B are used to transmit data from the BS to the RS if there is data to be transmitted from the BS to the RS and to transmit data from the RS to an MS if there is no data to be transmitted from the BS to the RS.

A BS informs an RS of the presence/absence of data to be transmitted to the RS in each subframe B, using indication information. If there is no data to be transmitted to the RS, the BS allows the RS to transmit data to an MS using a specific subframe B. Although not illustrated in a separate drawing, the allowing operation may include an operation in which the BS allocates the specific subframe B to the RS using a resource allocator.

In this situation, the BS should inform, in advance, the RS of the presence/absence of data to be transmitted to the RS in the specific subframe B. In one scheme proposed in this specification, a BS sets a flag of 1 bit or $N_R$ bits in a control message carried on an R-PDCCH in each subframe A, and informs in advance an RS of the presence/absence of data to be transmitted to the RS in the succeeding subframe B or a predetermined number of, e.g., $N_R$ subframes. In another scheme, using the surplus resources unused for data and existing control information like the N1-OFDM symbol parts 409 and 611 of FIGS. 4 and 6 in each subframe A, a BS transmits an indicator indicating the presence/absence of data to the transmitted to an RS in the succeeding subframe B or a predetermined number of subframes B, thereby informing the RS in advance whether the RS can use each subframe B. For example, the indicator may be used in the form of ON/OFF. If the indicator is used in the form of ON ('1'), it may indicate the presence of data to be transmitted to an RS through the subframe B. If the indicator is used in the form of OFF ('0'), it may indicate the absence of data to be transmitted to an RS through the subframe B. Although not illustrated in a separate drawing, the operation of informing the RS in advance using the indication information may include an operation in which the BS informs the presence/absence of data to be transmitted to the RS in the specific subframe B, by means of an indication information transmitter.

Figure 10:
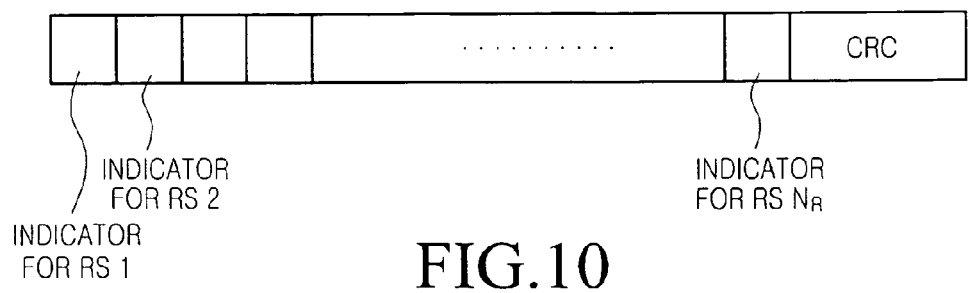
FIG. 10 illustrates a scheme for informing in advance an RS of the presence/absence of data to be transmitted to the RS through a subframe B according to an embodiment of the present invention.

FIG. 10 illustrates an example of one scheme for informing in advance an RS of the presence/absence of data to be transmitted to the RS through a subframe B according to an embodiment of the present invention.

Referring to FIG. 10, a control message carried on an R-PDCCH may transmit control commands for a plurality of RSs at a time. The illustrated control message consists of $N_R$ bits, to which indicators for $N_R$ RSs are mapped, respectively. The bits, to which the RSs' indicators are assigned, respectively, may indicate the presence/absence of data to be transmitted to their associated RSs. For example, if a bit assigned to an RS 1 is set to '1', it may indicate the presence of data to be transmitted to the RS 1 in the next subframe B. If the bit is set to '0', it may indicate the absence of data to be transmitted to the RS 1 in the next subframe B.

Figure 11A:
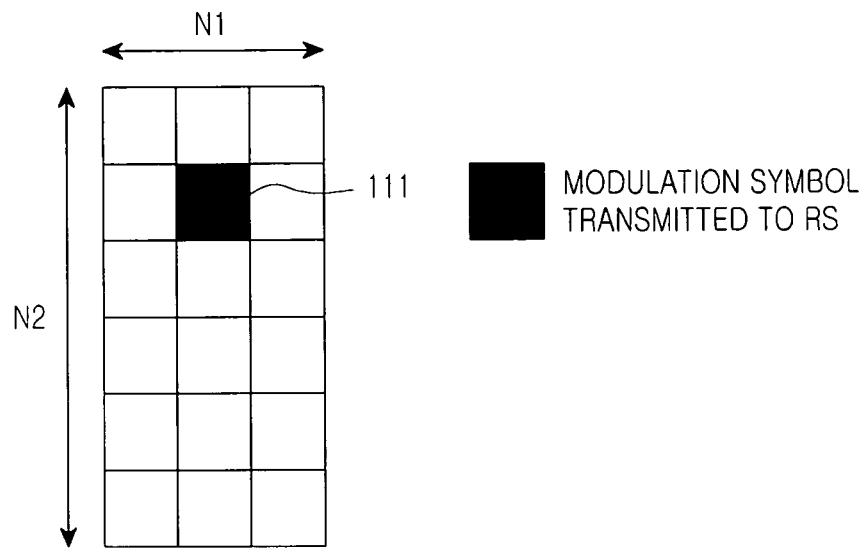
FIGS. 11A and 11B illustrate a scheme for informing in advance an RS of the presence/absence of data to be transmitted to the RS through a subframe B according to an embodiment of the present invention.
Figure 11B:
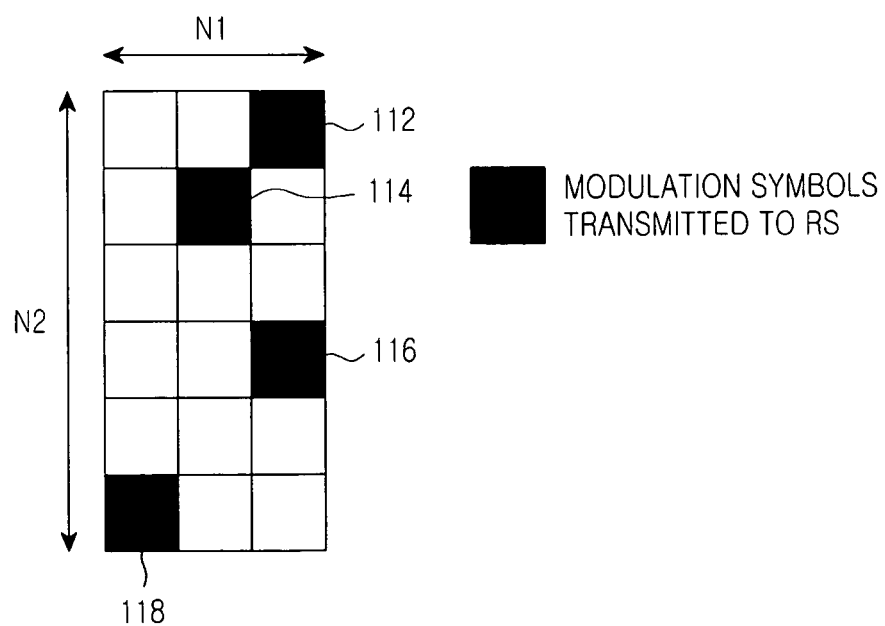

FIGS. 11A and 11B illustrate an example of a scheme for informing in advance an RS of the presence/absence of data to be transmitted to the RS through a subframe B according to an embodiment of the present invention.

Referring to FIGS. 11A and 11B, N1-OFDM symbol parts 409 and 611 each consist of N1×N2 modulation symbols, to which a plurality of RSs are assigned, respectively. The modulation symbols, to which a plurality of RSs are assigned, respectively, may indicate the presence/absence of data to be transmitted to their associated RSs. For example, if a constellation signal point corresponding to '1' is transmitted through a modulation symbol 111, it may indicate the presence of data to be transmitted to the associated RS in the next subframe B. If a constellation signal point corresponding to '0' is transmitted through the modulation symbol 111, it may indicate the absence of data to be transmitted to the associated RS in the next subframe B.

FIG. 11A illustrates an example of informing an RS of the presence of data to be transmitted to the RS in the next subframe B, using one modulation symbol 111 according to an embodiment of the present invention.

FIG. 11B illustrates an example of information an RS of the presence of data to be transmitted to the RS in the next subframe B, using a plurality of modulation symbols 112, 114, 116 and 118 according to an embodiment of the present invention. That is, a signal informing one RS of the presence of data to be transmitted to the RS in the next subframe B may be generated with 4 modulation symbols 112, 114, 116 and 118, and the generated signal may be transmitted through the modulation symbols 112, 114, 116 and 118 occupying different frequency and time regions, thereby obtaining diversity gain.

Meanwhile, in transmitting the signal consisting of the 4 modulation symbols 112, 114, 116 and 118, a plurality of orthogonal codes may be used to inform a plurality of RSs of the presence of data to be transmitted thereto. For example, length-4 orthogonal codes for 4 RSs may be generated as follows.

$$W1=+1+1+1+1$$

$$W2=+1+1-1-1$$

$$W3=+1-1-1+1$$

$$W4=+1-1+1-1$$

With the use of the orthogonal codes, a signal can be transmitted to 4 different RSs through 4 modulation symbols. That is, a BS multiplies a 1-bit control signal by an orthogonal code W assigned to each RS and transmits the resulting signal, and upon receiving the signal, each RS may extract a desired control signal by multiplying the received signal by its orthogonal code. Here, the control signal indicates the presence/absence of data that a BS will transmit to a relevant RS.

As is apparent from the foregoing description, the present invention provides an apparatus and method for efficiently allocating resources for a signal transmitted from a BS to an RS, thereby minimizing waste of resources.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for allocating resources in a communication system including at least one Relay Station (RS), the method comprising:
    allocating, into a first time region of a subframe, a control channel carrying control information from a Base Station (BS) to a Mobile Station (MS);
    allocating, into a second time region of the subframe, a data channel carrying data from the BS to the MS, an RS-control channel carrying control information from the BS to an RS, and an RS-data channel carrying data from the BS to the RS, using Frequency Division Multiplexing (FDM), such that frequencies associated with the RS-control channel are different from frequencies associated with the RS-data channel, the RS-control channel comprising a first relay-control channel and a second relay-control channel, wherein control information on the first relay-control channel indicates a location of resources to which the second relay-control channel is allocated and control information on the second relay-control channel indicates a location of resources to which the RS-data channel is allocated; and
    transmitting the subframe into which the control channel, the data channel, the RS-control channel, and the RS-data channel are allocated.

2. The method of claim 1, wherein the control information on the RS-control channel is transmitted over a remaining time region determined by subtracting a time corresponding to a last N1 Orthogonal Frequency Division Multiplexing (OFDM) symbols from the second time region.

3. The method of claim 1, wherein the control information on the RS-control channel and the data on the RS-data channel are transmitted over a remaining time region determined by subtracting a time corresponding to a first Nd OFDM symbols from the second time region.

4. The method of claim 3, wherein the Nd is calculated as a difference between a number of OFDM symbols of the data channel and a number of OFDM symbols of the RS-data channel.

5. The method of claim 1, wherein the control information on the first relay-control channel and the control information on the second relay-control channel are FDM-transmitted in the second time region, and wherein the control information on the first relay-control channel further indicates, a size of data carried on the RS-data channel, and a first Modulation and Coding Scheme (MCS).

6. The method of claim 5, wherein the control information on the second relay-control channel further indicates a second MCS.

7. A method for allocating resources in a communication system including at least one Relay Station (RS), the method comprising:
    if there is no data to be transmitted from a Base Station (BS) to an RS, allocating a first subframe previously allocated for data transmission from the BS to the RS such that the RS may use the first subframe for data transmission from the RS to a Mobile Station (MS); and
    transmitting to the RS indication information indicating presence or absence of data to be transmitted from the BS to the RS in the first subframe using a second subframe preceding the first subframe.

8. The method of claim 7, wherein the indication information is transmitted over an RS-control channel carrying control information from the BS to the RS in the second subframe and includes a flag comprising at least one bit corresponding to at least one RS.

9. The method of claim 8, wherein each bit of the flag indicates the presence or absence of data to be transmitted from the BS to a relevant RS.

10. The method of claim 7, wherein the indication information is transmitted over last N1 Orthogonal Frequency Division Multiplexing (OFDM) symbols in a time region in which an RS-control channel carrying control information from the BS to the RS in the second subframe is allocated.

11. The method of claim 10, wherein the indication information is transmitted using a plurality of modulation symbols included in the last N1 OFDM symbols, and the plurality of modulation symbols correspond to a plurality of RSs, respectively, and indicate presence or absence of data to be transmitted from the BS to each of the plurality of RSs.

12. The method of claim 10, wherein the indication information is transmitted using a plurality of modulation symbols included in the last N1 OFDM symbols, and the plurality of modulation symbols correspond to a plurality of RSs, respectively, and are generated by orthogonally multiplexing control signals indicating presence or absence of data to be transmitted from the BS to the plurality of RSs.

13. An apparatus for allocating resources in a communication system including at least one Relay Station (RS), the apparatus comprising:
   a control channel generator configured to generate a signal of a control channel carrying control information from a Base Station (BS) to a Mobile Station (MS) and a signal of an RS-control channel carrying control information from the BS to an RS;
   a data channel generator configured to generate a signal of a data channel carrying data from the BS to the MS and a signal of an RS-data channel carrying data from the BS to the RS;
   a resource allocator configured to map the signal of the control channel to a first time region of a subframe and map the signals of the RS-control channel, the data channel and the RS-data channel to a second time region of the subframe such that frequencies associated with the RS-control channel are different from frequencies associated with the RS-data channel, the RS-control channel comprising a first relay-control channel and a second relay-control channel, wherein control information on the first relay-control channel indicates a location of resources to which the second relay-control channel is allocated and control information on the second relay-control channel indicates a location of resources to which the RS-data channel is allocated; and
   a transmitter configured to transmit the subframe to which the signals of the control channel, the data channel, the RS-control channel, and the RS-data channel are mapped,
   wherein the channels mapped to the second time region undergo Frequency Division Multiplexing (FDM).

14. The apparatus of claim 13, wherein the signal of the RS-control channel is transmitted over a remaining time region determined by subtracting a time corresponding to a last N1 Orthogonal Frequency Division Multiplexing (OFDM) symbols from the second time region.

15. The apparatus of claim 13, wherein the signal of the RS-control channel and the signal of the RS-data channel are transmitted over a remaining time region determined by subtracting a time corresponding to a first Nd OFDM symbols from the second time region.

16. The apparatus of claim 15, wherein the Nd is calculated as a difference between a number of OFDM symbols of the data channel and a number of OFDM symbols of the RS-data channel.

17. The apparatus of claim 13, wherein the signal of the first relay-control channel and the signal of the second relay-control channel are FDM-transmitted in the second time region, and wherein the first control relay-channel further carries control information indicating a size of data carried on the RS-data channel, and a first Modulation and Coding Scheme (MCS).

18. The apparatus of claim 17, wherein the second relay-control channel carries a second MCS.

19. An apparatus for allocating resources in a communication system including at least one Relay Station (RS), the apparatus comprising:
   a resource allocator configured to, if there is no data to be transmitted from a Base Station (BS) to an RS, allocate a first subframe allocated for data transmission from the BS to the RS such that the RS may use the first subframe for data transmission from the RS to a Mobile Station (MS); and
   an indication information transmitter configured to transmit to the RS indication information indicating presence or absence of data to be transmitted from the BS to the RS in the first subframe using a second subframe preceding the first subframe.

20. The apparatus of claim 19, wherein the indication information is transmitted over an RS-control channel carrying control information from the BS to the RS in the second subframe, and includes a flag comprising at least one bit corresponding to at least one RS.

21. The apparatus of claim 20, wherein each bit of the flag indicates the presence or absence of data to be transmitted from the BS to a relevant RS.

22. The apparatus of claim 19, wherein the indication information is transmitted over last N1 Orthogonal Frequency Division Multiplexing (OFDM) symbols in a time region in which an RS-control channel carrying control information from the BS to the RS in the second subframe is allocated.

23. The apparatus of claim 22, wherein the indication information is transmitted using a plurality of modulation symbols included in the last N1 OFDM symbols, and the plurality of modulation symbols correspond to a plurality of RSs, respectively, and indicate presence or absence of data to be transmitted from the BS to each of the plurality of RSs.

24. The apparatus of claim 22, wherein the indication information is transmitted using a plurality of modulation symbols included in the last N1 OFDM symbols, and the plurality of modulation symbols correspond to a plurality of RSs, respectively, and are generated by orthogonally multiplexing control signals each indicating presence or absence of data to be transmitted from the BS to the plurality of RSs.

* * * * *